United States Patent
Omori et al.

(10) Patent No.: US 6,592,798 B1
(45) Date of Patent: Jul. 15, 2003

(54) METHOD FOR PREPARING EUTECTIC CERAMICS

(75) Inventors: Mamoru Omori, 1-42, Takamori 1-Chome, Izumi-Ku, Sendai City, Miyagi 981-3203 (JP); Toshio Hirai, Sendai (JP); Masao Tokita, Tokyo (JP)

(73) Assignees: Mamoru Omori, Miyagi (JP); Sumitomo Coal Mining Co., Ltd., Tokyo (JP)

( * ) Notice: Subject to any disclaimer, the term of this patent is extended or adjusted under 35 U.S.C. 154(b) by 0 days.

(21) Appl. No.: 09/980,738

(22) PCT Filed: Mar. 29, 2000

(86) PCT No.: PCT/JP00/01948

§ 371 (c)(1),
(2), (4) Date: Apr. 8, 2002

(87) PCT Pub. No.: WO00/58235

PCT Pub. Date: Oct. 5, 2000

(30) Foreign Application Priority Data

Mar. 29, 1999 (JP) .......................................... 11-086581

(51) Int. Cl.[7] .............................................. C04B 33/32
(52) U.S. Cl. ...................... 264/434; 264/430; 264/603; 264/674; 264/676; 264/681; 117/4; 117/6
(58) Field of Search ............................ 106/87, 88, 90, 106/152, 153; 264/430, 434, 603, 674, 676, 681; 117/4, 6

(56) References Cited

U.S. PATENT DOCUMENTS 3,241,956 A * 3/1966 Inoue .......................... 419/52
5,720,917 A * 2/1998 Matsuura et al. ........... 264/432
6,384,365 B1 * 5/2002 Seth et al. ................. 219/76.13

FOREIGN PATENT DOCUMENTS

| EP | 0 816 537 A | * | 1/1998 |
| JP | 5-85821 A | * | 4/1993 |
| JP | 5-97507 A | * | 4/1993 |
| JP | 7-216409 A | * | 8/1995 |
| JP | 10-251070 A | * | 9/1998 |

OTHER PUBLICATIONS

Tokita, "Mechanism of Spark Plasma Sintering," Proceedings of the international Symposium on Microwave, Plasma and Thermochemical Processing of Advance Materials, 1997, pp. 69–76, Joining and Welding Research Intsitute, Osaka University.*

* cited by examiner

*Primary Examiner*—James Derrington
(74) *Attorney, Agent, or Firm*—Armstrong, Westerman & Hattori, LLP.

(57) ABSTRACT

A method for advantageously producing sintered eutectic ceramics having a homogenous and dense structure, in particular, a eutectic containing a rare earth aluminate compound. The method allows eutectic powder of alumina and a rare earth aluminate compound to stand at a temperature of 1300–1700° C. for 1–120 minutes under vacuum or in an non-oxidative atmosphere under a pressure of 5–100 MPa using a spark plasma sintering apparatus, thereby causing crystal growth to occur to obtain a rare earth aluminate eutectic structure crystal.

4 Claims, 1 Drawing Sheet

METHOD FOR PREPARING EUTECTIC CERAMICS

TECHNICAL FIELD

The present invention relates to a method for producing eutectic ceramics. More particularly, the present invention relates to a method for producing a eutectic crystal structure (hereinafter simply called "eutectic") from eutectic powder of a rare earth aluminate and alumina or a rare earth oxide. Specifically, the present invention provides dense sintered eutectic ceramics compact which are almost indestructible in comparison with conventional materials, and can be used in various types of industrial applications.

BACKGROUND ART

Conventionally, eutectic ceramics such as a eutectic of alumina and a rare earth aluminate compound are produced using the Bridgman technique, which is one type of single crystal growth technique. Specifically, a formed product with a desired shape is produced by unidirectional solidification which consists of filling a crucible made of molybdenum or tungsten with a specimen, melting the specimen at a high temperature, and slowly cooling the specimen from the bottom, thereby allowing a eutectic crystal to be grown continuously from the bottom to the top (D. Viechnicki and F. Schmid, J. Mater. Sci., 4 (1969) 84–88). This eutectic is an excellent high-temperature material maintaining strength up to 1700° C. (Y. Waku, H. Ohtsubo, N. Nakagawa, and Y. Kohtoku, J. Mater. Sci., 31 (1996) 4663–4670).

In the above method for producing eutectics using unidirectional solidification, the size of the specimen is limited depending on the size of the crucible. Moreover, since only a cylindrical eutectic is produced, it is necessary to process the eutectic into a specific shape suitable for actual application. Furthermore, synthesis of the specimen using a conventional method requires a slow cooling step, whereby a long period of time is needed to allow a large eutectic to be grown.

In principle, the above eutectic structure is obtained by melting the raw materials for the eutectic composition and causing the melt to solidify. For example, the eutectic is obtained in a short period of time by filling a water-cooled copper container with a specimen and dissolving the specimen using an arc or electron beams. However, since this method cannot allow the specimen to be homogenously dissolved, the resulting eutectic structure becomes inhomogenous and includes a large number of pores, whereby a large number of cracks is produced. Because of this, it is difficult to produce a large eutectic material.

A eutectic with a comparatively homogenous structure can be obtained by placing the raw materials for the eutectic composition in a large furnace and dissolving the raw materials only at the center portion using an arc. In this case, cracks also tend to be produced, whereby it is difficult to obtain a large eutectic.

Eutectic powder is obtained by grinding the eutectic obtained using these methods. A eutectic with a desired shape can be obtained by subjecting the eutectic powder to crystal growth or sintering. However, conventional sintering techniques do not allow the eutectic powder to be sufficiently grown to form a large eutectic.

Conventional sintering techniques used herein include a pressureless sintering method, a hot press method, and a hot isostatic pressing (HIP) method. In the pressureless sintering method, a starting powder material is sintered only by heating. The hot press method and the HIP method apply pressure in addition to heat in order to promote sintering. These two methods have an advantage in comparison with the pressureless sintering method in that the powder material can be sintered at a lower temperature. The difference between the hot press method and the HIP method is the capability of increasing the pressure to be applied.

These three methods promote the diffusion of substances using heat or heat and pressure in combination, thereby sintering the substances. However, a eutectic has a structure in which two constituent single crystals are intermingled. Therefore, these two single crystals must be separately grown in order to obtain a large eutectic using the eutectic powder as the raw material. This is a phenomenon differing from sintering for conventional polycrystals. Therefore, each crystal in the eutectic powder cannot be individually bonded by conventional sintering methods. As a result, only areas in which the same crystals happen to be located side by side are bonded, whereby a large number of pores is allowed to remain. This hinders densification of a sintered body.

DISCLOSURE OF THE INVENTION

An object of the present invention is to provide a method for advantageously producing eutectic ceramics having a homogenous and dense structure, in particular, a eutectic containing a rare earth aluminate compound.

In order to achieve the above object, the present invention essentially provides the following production methods. Specifically, the present invention provides a method for producing eutectic ceramics comprising allowing eutectic ceramics powder to stand at a temperature of 500–2000° C. for 1–120 minutes under vacuum or in an non-oxidative atmosphere under a pressure of 5–100 MPa using a spark plasma sintering process, thereby causing crystal growth to occur.

In particular, the present invention provides a method for producing a eutectic containing a rare earth aluminate compound, comprising allowing eutectic powder of alumina and rare earth aluminate compound to stand at a temperature of 1300–1700° C. for 1–120 minutes under vacuum or in an non-oxidative atmosphere under a pressure of 5–100 MPa using a spark plasma sintering apparatus, thereby causing crystal growth to occur to obtain a sintered body of a rare earth aluminate eutectic structure.

In the present invention, the eutectic powder used as the starting raw material is preferably one eutectic powder of alumina and a rare earth aluminate compound selected from the group consisting of $Al_2O_3$ and $Ln_3Al_5O_{12}$, $Al_2O_3$ and $LnAlO_3$, $Ln_2O_3$ and $Ln_2Al_5O_{12}$, $Ln_2O_3$ and $LnAlO_3$, and $Ln_2O_3$ and $Ln_4Al_2O_9$, or one ceramic powder selected from the group consisting of $MgAl_2O_4$—$LnAlO_3$, $MgO$—$Al_2O_3$, $MgO$—$CaO$, $Al_2O_3$—$Nb_2O_5$, $CaO$—$Al_2O_3$, $Al_2O_3$—$ZrO_2$, $B_4C$—$SiC$, $B_4C$—$TiB_2$, $B_4C$—$YB_6$, $PbO$—$Fe_2O_3$, $PbO$—$Nb_2O_5$, $PbO$—$V_2O_5$, $PbO$—$GeO_2$, $BaO$—$WO_3$, $V_2O_5$—$BaO$, $Bi_2O_3$—$GeO_2$, $V_2O_5$—$ZnO$, $PbO$—$WO_3$, $PbO$—$ZnO$, $Bi_2O_3$—$Fe_2O_3$, $V_2O_5$—$Cr_2O_3$, $Li_2WO_4$—$WO_3$, $V_2O_5$—$MnO$, $V_2O_5$—$NiO$, $V_2O_5$—$CuO$, $Bi_2O_3$—$Al_2O_3$, $V_2O_5$—$CaO$, $Bi_2O_3$—$Mn_2O_3$, $Bi_2O_3$—$TiO_2$, $CaO$—$WO_3$, $SrO$—$WO_3$, $MgO$—$WO_3$, $Fe_2O_3$—$Ln_2O_3$, and $Nb_2O_3$—$Bi_2O_3$.

Among the eutectic ceramicss obtained by the present invention, examples of the rare earth alumunate eutectics include an $Al_2O_3$—$Ln_3Al_5O_{12}$ eutectic, $Al_2O_3$—$LnAlO_3$ eutectic, $Ln_2O_3$—$Ln_3Al_5O_{12}$ eutectic, $Ln_2O_3$—$LnAlO_3$ eutectic, $Ln_2O_3$—$Ln_4Al_2O_9$ eutectic, $MgAl_2O_4$—$LnAlO_3$ eutectic, $MgO$—$Al_2O_3$ eutectic, $MgO$—$CaO$ eutectic, $Al_2O_3$—$Nb_2O_5$ eutectic, $CaO$—$Al_2O_3$ eutectic, $Al_2O_3$—$ZrO_2$ eutectic, and the like.

BEST MODE FOR CARRYING OUT THE INVENTION

Figure 1:
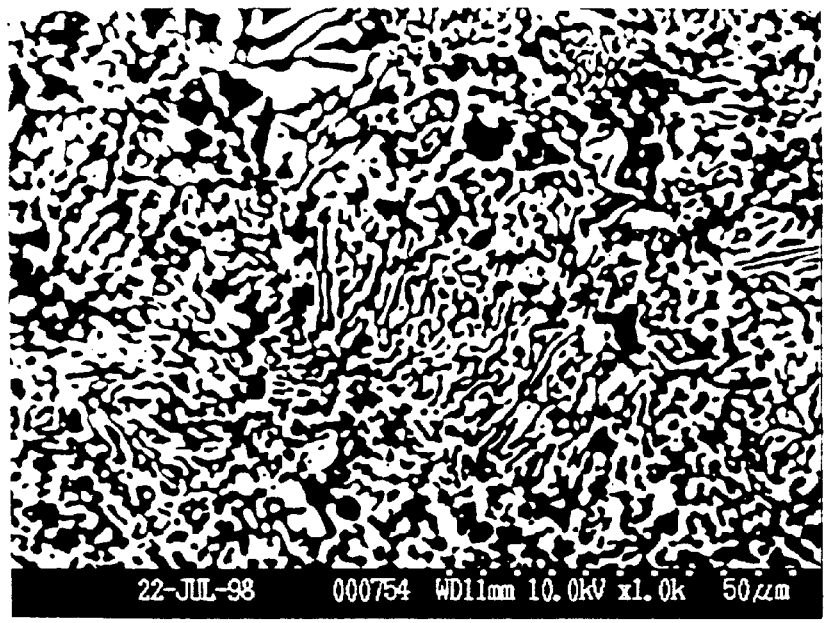
FIG. 1 is a scanning electron microscope photograph of an $Al_2O_3$—$Y_3Al_5O_{12}$ eutectic sintered compact.

One of the features of the present invention is a sintering method for the raw material. The present inventors have given attention a spark plasma sintering (hereinafter abbreviated as "SPS") method as a sintering method. An apparatus used in the SPS method (spark plasma sintering apparatus) is basically similar to a hot press apparatus. However, these apparatuses differ as to power supply and heating method. In a hot press method, a starting powder material is indirectly heated by allowing alternating current to flow through a graphite heater incorporated into a vacuum chamber.

On the contrary, the SPS method uses no heater. In the SPS method, a graphite mold filled with a starting powder material is placed in a vacuum chamber similar to that used in the hot press method. Pressure is applied to the graphite mold from the top and bottom using upper and lower energizing punch electrodes. At the same time, pulsed direct current is allowed to flow through the graphite mold through the energizing punch electrodes at intervals of a millisecond or less. In this case, pulsed direct current may be applied at an initial stage of sintering and continuous direct current may be applied thereafter. Or, continuous pulsed direct current may be applied throughout the sintering. This increases the temperature using the graphite mold as a resistance, thereby sintering the starting powder material. A power supply for generating pulsed direct current used herein is similar to that used for an electrical discharge machine.

Specifically, a conventional electrical discharge machine processes a conductor by utilizing thermal plasma generated by allowing an electric discharge to occur between electrodes and workpiece. In the SPS method, a space for generating plasma is not present in the electric circuit. When electrical conduction is achieved, most of the current flows through the graphite mold which encloses the starting powder material. At this time, leakage current flows through the surface of the powder with which the graphite mold is filled even if the powder is a non-conductive material. If the current is pulsed direct current, spark plasma with a small amount of energy and spark impact pressure are generated by electrical discharging phenomena between the powder particles at the beginning of energizing. In the present invention, the temperature of the powder is increased by the spark plasma and eliminated absorptive gas and impurities adhering to the powder is removed by spark impact pressure. This causes part of an oxide film on the surface of the powder material (metallic or non-oxide ceramics) to be destroyed, whereby the powder is purified, activated, and easily sintered. Therefore, the method of the present invention ensures that a powder material which cannot be sintered using a conventional method is sintered to high density.

In addition to the above-described phenomena, in the SPS method, since pulsed direct current is allowed to flow through the graphite, the powder exists in an electric field in a specific direction, whereby the diffusion of ions is accelerated by the electric field. Therefore, in the case where positive and negative charge separation takes place in the powder material, the powder material shows orientation due to positive and negative bonding.

The present inventors have found that the crystal of the eutectic powder is grown to high density by placing a graphite mold filled with the eutectic powder in a spark plasma sintering apparatus and allowing pulsed direct current or with continuous direct current to flow through the mold while applying pressure.

The reason why the crystal growth is promoted by the process of the present invention to form a dense eutectic sintered compact is considered to be as follows. Specifically, in the case where positive and negative charge separation occurs in one of two crystals, such crystals are oriented in the electric field. The same crystals are bonded to each other due to positive and negative bonding, whereby the crystals are grown to form a large eutectic.

Positive and negative charge separation tends to take place in compound in which oxygen defects tend to be produced. In the case of using $Al_2O_3$ and a rare earth aluminate, a rare earth aluminate is such a compound.

In the present invention, as the eutectic ceramic powder used as the starting powder material, one eutectic powder selected from the group consisting of $MgAl_2O_4$—$LnAlO_3$, $MgO$—$Al_2O_3$, $MgO$—$CaO$, $Al_2O_3$—$Nb_2O_5$, $CaO$—$Al_2O_3$, $Al_2O_3$—$ZrO_2$, $B_4C$—$SiC$, $B_4C$—$TBi_2$, $B_4C$—$YB_6$, $PbO$—$Fe_2O_3$, $PbO$—$Nb_2O_5$, $PbO$—$V_2O_5$, $PbO$—$GeO_2$, $BaO$—$WO_3$, $V_2O_5$—$BaO$, $Bi_2O_3$—$GeO_2$, $V_2O_5$—$ZnO$, $PbO$—$WO_3$, $PbO$—$ZnO$, $Bi_2O_3$—$Fe_2O_3$, $V_2O_5$—$Cr_2O_3$, $Li_2WO_4$—$WO_3$, $V_2O_5$—$MnO$, $V_2O_5$—$NiO$, $V_2O_5$—$CuO$, $Bi_2O_3$—$Al_2O_3$, $V_2O_5$—$CaO$, $Bi_2O_3$—$Mn_2O_3$, $Bi_2O_3$—$TiO_2$, $CaO$—$WO_3$, $SrO$—$WO_3$, $MgO$—$WO_3$, $Fe_2O_3$—$Ln_2O_3$, and $Nb_2O_5$—$Bi_2O_3$ is used.

As other examples, three types of rare earth aluminate compounds, specifically, $ALn_3Al_5O_{12}$, $LnAlO_3$, and $Ln_4Al_2O_9$ (Ln is a rare earth element including Sc, Y, La, Ce, Pr, Nd, Sm, Eu, Gd, Tb, Dy, Ho, Er, Tm, Yb, and Lu) can be given.
(1) Element which makes up an $Ln_3Al_5O_{12}$ compound: Ln=Sc, Y, Dy, Ho, Er, Tm, Yb, or Lu
(2) Element which makes up an $LnAlO_3$ compound: Ln=La, Pr, Nd, Sm, Eu, Gd, Dy, Ho, or Er
(3) Element which makes up an $Ln_4Al_2O_9$ compound: Ln=Y, Gd, Dy, Ho, Er, Tm, or Yb As examples of eutectic powder containing a rare earth aluminate compound, (1) $Al_2O_3$—$Ln_3Al_5O_{12}$ eutectic powder, wherein Ln is Sc, Y, Dy, Ho, Er, Tm, Yb, or Lu, (2) $Al_2O_3$—$LnAlO_3$ eutectic powder, wherein Ln is La, Pr, Nd, Sm, Eu, or Gd, (3) $Al_2O_3$—$Ln_3Al_5O_{12}$ eutectic powder, wherein Ln is Sc, Y, Dy, Ho, Er, Tm, Yb, or Lu, (4) $Ln_2O_3$—$Ln_3Al_5O_{12}$ eutectic powder, wherein Ln is Lu, (5) $Ln_2O_3$—$LnAlO_3$ eutectic powder, wherein Ln is La, Pr, Nd, Sm, or Eu, and (6) $Ln_2O_3$—$Ln_4Al_2O_9$ eutectic powder, wherein Ln is Y, Gd, Dy, Ho, Er, Tm, or Yb can be given.

In the present invention, a typical combination of the powder materials is alumina ($Al_2O_3$) powder and the above rare earth oxide powder. The powder is prepared by mixing these powders. This mixed powder is poured into an SPS crucible and melted by applying electricity. The mixed powder is formed and presintered at a temperature of 1000–1500° C. to obtain a low density sintered body. The sintered body is melted in a crucible, in an arc melting furnace, using electronic beams, or using microwaves to obtain a eutectic block.

The eutectic block thus obtained is ground to prepare eutectic powder used as the raw material. This eutectic powder is stacked into a graphite crucible and allowed to stand at a temperature of 1300–1700° C. for 1–120 minutes under vacuum or in an non-oxidative atmosphere under a pressure of 5–100 MPa using an SPS apparatus, thereby causing crystal growth to occur to obtain a dense eutectic sintered compact.

Among the above processing conditions, the pressure to be applied is limited to 5–100 MPa for the following reasons. Specifically, if the pressure is less than 5 MPa, current does not flow through the graphite mold due to poor adhesion of the mold. If the pressure exceeds 100 MPa, the graphite mold may break.

If the crystal growth temperature is less than 1300° C., a dense eutectic sintered compact cannot be produced due to a decreased crystal growth rate. There is no need to increase the temperature to more than 1700° C., since a dense eutectic compact is produced at 1700° C. or less. In addition, such a high temperature may cause the eutectic to melt.

If the holding time at a maximum temperature is less than one minute, the crystal growth may be insufficient, whereby a dense eutectic compact cannot be obtained. A holding time of more than 120 minutes has little effect on densification, since the crystal growth has already been completed. Therefore, the holding time is suitably 1–120 minutes.

As described above, there are various types of eutectic powders which can be used as the starting powder material. The melting point of these eutectic powders varies over a wide range. For example, the melting point of a $V_2O_5$—CuO eutectic is 620° C., and the melting point of a $W_2B_5$—$B_4C$ eutectic is 2200° C. Such a eutectic powder is poured into a graphite crucible and allowed to stand at a temperature of 500–2000° C. for 1–120 minutes under vacuum or in an non-oxidative atmosphere under a pressure of 5–100 MPa using a spark plasma sintering apparatus. This causes crystal growth to occur to obtain a dense eutectic compact of each eutectic powder. In this method, if the temperature is less than 500° C., a dense eutectic compact cannot be obtained due to insufficient crystal bonding. If the temperature is more than 2000° C., crystal bonding does not proceed any further or the sample may be melted. Therefore, the heating temperature is suitably 500–2000° C.

The present invention is described below by examples.

EXAMPLE 1

Synthesis of $Al_2O_3$—$Y_3Al5O_{12}$ Eutectic 82 mol % of $Al_2O_3$ and 18 mol % of $Y_2O_3$ were mixed for 20 hours using a wet ball mill method using alcohol. The mixture was dried, formed, and presintered at 1300° C. for two hours to obtain a low density sintered body. The low density sintered body was melted in an arc melting furnace to synthesize a eutectic block. The eutectic block was placed in a vessel made of cemented carbides and ground for two hours in a planetary ball mill. Tungsten carbide (WC) was removed using a $HNO_3$—$H_3PO_4$ mixed acid to obtain eutectic powder.

This eutectic powder was stacked into a graphite mold with a diameter of 50 mm and placed in a spark plasma sintering apparatus. After evacuating the atmosphere inside the apparatus, 2000 amperes of current were allowed to flow though the graphite mold while applying a pressure of 30 MPa. After increasing the current intensity to 3800 amperes for 10 minutes, the graphite mold was held at a temperature of 1640° C., at which the specimen did not shrink, for 10 minutes to obtain a eutectic.

FIG. 1 shows a photograph of the eutectic sintered compact thus produced. As is clear from this photograph, this eutectic sintered compact had a structure differing from that of a eutectic obtained by unidirectional solidification, which was completely different from the structure of an $Al_2O_3$—$Y_3Al_5O_{12}$ composite material.

The density and the bending strength of the eutectic sintered compact were respectively 4.31 g/cm² and 450 MPa. These values are the same as those of a eutectic obtained by unidirectional solidification.

EXAMPLE 2

Synthesis of $Al_2O_3$—$PrAlO_3$ Eutectic and $Pr_2O_3$—$PrAlO_3$ Eutectic $Al_2O_3$ powder and $Pr_2O_3$ powder shown in Table 1 were mixed for 24 hours using a wet ball mill method using alcohol. The mixture was dried to obtain mixed powder.

This mixed powder was formed, presintered at 1400° C. in air, and melted using an arc melting furnace to obtain a melt of a eutectic structure. The melt was cooled and ground. The raw material eutectic powder thus obtained was stacked into a graphite mold with a diameter of 50 mm and placed in a spark plasma sintering apparatus. The atmosphere inside the spark plasma sintering apparatus was evacuated and replaced by $N_2$ gas. After increasing the temperature of the graphite mold to a temperature shown in Table 1 for five minutes in $N_2$ gas at one atmosphere pressure, the graphite mold was held at this temperature for five minutes to obtain a dense $Al_2O_3$—$PrAlO_3$ eutectic sintered compact and $Pr_2O_3$—$PrAlO_3$ eutectic sintered compact.

The bulk density and the bending strength of the $Al_2O_3$—$PrAlO_3$ eutectic sintered compact were respectively 5.0 g/cm² and 600 MPa. The bulk density and the bending strength of the $Pr_2O_3$—$PrAlO_3$ eutectic were respectively 6.75 g/cm² and 550 MPa.

TABLE 1

|  | $Al_2O_3$—$PrAlO_3$ eutectic | $Pr_2O_3$—$PrAlO_3$ eutectic |
| --- | --- | --- |
| $Al_2O_3$ (mol %) | 79.3 | 25 |
| $Pr_2O_3$ (mol %) | 20.7 | 75 |
| Atmosphere | $N_2$ gas | $N_2$ gas |
| Pressure (MPa) | 30 | 30 |
| Temperature (° C.) | 1610 | 1620 |
| Holding time (min.) | 5 | 5 |

EXAMPLE 3

Synthesis of $Al_2O_3$—$GdAlO_3$ Eutectic 77 mol % of $Al_2O_3$ powder and 23 mol % of $Gd_2O_3$ powder were mixed for 24 hours using a wet ball mill method using alcohol. The mixture was dried, formed, and presintered at 1300° C. for two hours in air. The low density sintered body was melted in an arc melting furnace to obtain a eutectic block. The eutectic block was ground to obtain raw material eutectic powder.

This eutectic powder was stacked into a graphite mold with a diameter of 50 mm and placed in a spark plasma sintering apparatus. After evacuating the atmosphere inside the apparatus, current was allowed to flow though the graphite mold under vacuum, thereby slowly increasing the temperature of the graphite mold from room temperature to 1620° C. at which the specimen ceased to shrink for 20 minutes. The graphite mold was held at this temperature for 10 minutes to obtain an $Al_2O_3$—$GdAlO_3$ eutectic compact.

Figure 2:
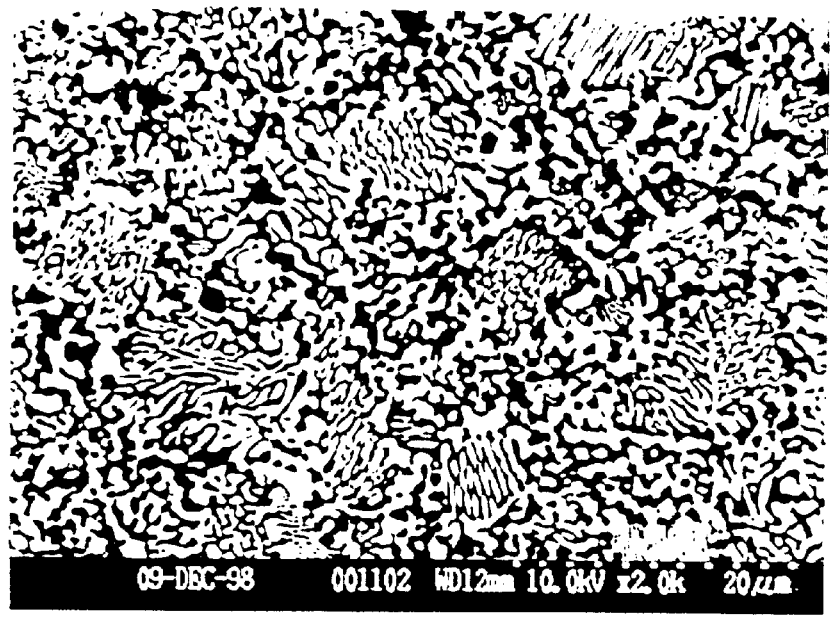
FIG. 2 is a scanning electron microscope photograph of an $Al_2O_3$—$GdAlO_3$ eutectic sintered compact.

FIG. 2 shows a scanning electron microscope photograph of this eutectic compact. The bulk density of this eutectic compact was 5.64 g/cm², which is close to that of a eutectic obtained by unidirectional solidification. The bending strength of the eutectic sintered compact was 550 MPa at room temperature, which is also close to that of a eutectic obtained by unidirectional solidification.

EXAMPLE 4

Synthesis of $Nd_2O_3$—$NdAlO_3$ Eutectic and $Al_2O_3$—$NdAlO_3$ Eutectic From $Nd_2O_3$ and $Al_2O_3$ $Al_2O_3$ powder and $Nd_2O_3$ powder at a ratio shown in Table 2 were mixed for 12 hours using a wet ball mill method using ethanol. The mixture was dried, formed, and sintered at 1200° C. for two hours to obtain a low density sintered body. The sintered body was melted in an arc melting furnace to obtain a melt. The melt was caused to solidify by cooling, ground using a ball mill made of tungsten carbide, and washed with an alkaline solution to obtain eutectic powder.

This eutectic powder was poured into a graphite mold with a diameter of 50 mm and placed in a spark plasma sintering apparatus. After evacuating the atmosphere inside the apparatus, the temperature of the graphite mold was increased to a temperature shown in Table 2 for 30 minutes. The graphite mold was held at this temperature for 30 minutes to obtain an $Al_2O_3$—$NdAlO_3$ eutectic sintered compact and an $Nd_2O_3$—$NdAlO_3$ eutectic sintered compact.

The bulk density and the bending strength of the $Al_2O_3$—$NdAlO_3$ eutectic sintered compact were respectively 5.10 g/cm² and 600 MPa. The bulk density and the bending strength of the $Nd_2O_3$—$NdAlO_3$ eutectic compact were respectively 6.70 g/cm² and 450 MPa.

TABLE 2

|  | $Al_2O_3$—$NdAlO_3$ eutectic | $Nd_2O_3$—$PrAlO_3$ eutectic |
|---|---|---|
| $Al_2O_3$ (mol %) | 80 | 22.5 |
| $Nd_2O_3$ (mol %) | 20 | 77.5 |
| Atmosphere | Vacuum | Vacuum |
| Pressure (MPa) | 40 | 40 |
| Temperature (° C.) | 1570 | 1680 |
| Holding time (min.) | 30 | 30 |

INDUSTRIAL APPLICABILITY

As described above, according to the present invention, eutectic ceramics containing a dense rare earth aluminate compound can be advantageously and reliably produced.

The eutectic ceramic material according to the present invention can be used in a wide range of industrial application fields including engine parts, gas turbine rotors, gas turbine parts, anti-corrosive apparatus parts, crucible, ball mill parts, heat exchanger parts for high temperature furnaces, heat resistant materials, heat resistant materials for high-altitude missiles, combustion pipes, die casting parts, insulating materials, fusion reactor materials, nuclear reactor materials, tools, heat shielding materials, electronic circuit substrates, sealing materials, joints and valve parts, pumps, nozzles, rollers, guide rails, bearings, and the like.

What is claimed is:

1. A method for producing sintered eutectic ceramics comprising allowing eutectic ceramic powder as a starting material to stand at a temperature of 500–2000° C. for 1–120 minutes under vacuum or in an non-oxidative atmosphere under a pressure of 5–100 MPa using a spark plasma sintering apparatus, thereby causing crystal growth to occur.

2. A method for producing a eutectic sintered compact containing a rare earth aluminate compound comprising allowing eutectic powder of alumina and a rare earth aluminate compound to stand at a temperature of 1300–1700° C. for 1–120 minutes under vacuum or in an non-oxidative atmosphere under a pressure of 5–100 MPa using a spark plasma sintering apparatus, thereby causing crystal growth to occur to obtain a sintered compact of a rare earth aluminate eutectic structure.

3. The method according to claim 1 or 2, wherein the eutectic powder used as the starting powder material is one eutectic powder of an alumina-rare earth aluminate compound selected from the group consisting of $Al_2O_3$ and $Ln_3Al_5O_{12}$, $Al_2O_3$ and $LnAlO_3$, $Ln_2O_3$ and $Ln_2Al_5O_{12}$, $Ln_2O_3$ and $LnAlO_3$, and $Ln_2O_3$ and $Ln_4Al_2O_9$, or one eutectic ceramic powder selected from the group consisting of $MgAl_2O_4$—$LnAlO_3$, $MgO$—$Al_2O_3$, $MgO$—$CaO$, $Al_2O_3$—$Nb_2O_5$, $CaO$—$Al_2O_3$, $Al_2O_3$—$ZrO_2$, $B_4C$—$SiC$, $B_4C$—$TiB_2$, $B_4C$—$YB_6$, $PbO$—$Fe_2O_3$, $PbO$—$Nb_2O_5$, $PbO$—$V_2O_5$, $PbO$—$GeO_2$, $BaO$—$WO_3$, $V_2O_5$—$BaO$, $Bi_2O_3$—$GeO_2$, $V_2O_5$—$ZnO$, $PbO$—$WO_3$, $PbO$—$ZnO$, $Bi_2O_3$—$Fe_2O_3$, $V_2O_5$—$Cr_2O_3$, $Li_2WO_4$—$WO_3$, $V_2O_5$—$MnO$, $V_2O_5$—$NiO$, $V_2O_5$—$CuO$, $Bi_2O_3$—$Al_2O_3$, $V_2O_5$—$CaO$, $Bi_2O_3$—$Mn_2O_3$, $Bi_2O_3$—$TiO_2$, $CaO$—$WO_3$, $SrO$—$WO_3$, $MgO$—$WO_3$, $Fe_2O_3$—$Ln_2O_3$, and $Nb_2O_3$—$Bi_2O_3$, wherein Ln is a rare earth element.

4. The method according to claim 2, wherein the sintered compact is one eutectic selected from the group consisting of an $Al_2O_3$—$Ln_3Al_5O_{12}$ eutectic, $Al_2O_3$—$LnAlO_3$ eutectic, $Ln_2O_3$—$Ln_3Al_5O_{12}$ eutectic, $Ln_2O_3$—$LnAlO_3$ eutectic, $Ln_2O_3$—$Ln_4Al_2O_9$ eutectic, $MgAl_2O_4$—$LnAlO_3$ eutectic, $MgO$—$Al_2O_3$ eutectic, $MgO$—$CaO$ eutectic, $Al_2O_3$—$Nb_2O_5$ eutectic, $CaO$—$Al_2O_3$ eutectic, and $Al_2O_3$—$ZrO_2$ eutectic, wherein Ln is a rare earth element.

* * * * *